United States Patent
Behm et al.

[11] Patent Number: 6,103,157
[45] Date of Patent: Aug. 15, 2000

[54] PROCESS FOR IMPREGNATING ELECTRICAL COILS

[75] Inventors: Dean Tallak Behm, Newark, Del.; Ulrich Weidmann, Basel, Switzerland; Philip David Willis, Rheinfelden, Switzerland; Felix Bleuel, Basel, Switzerland; Hans-Fred Buchmann, Schopfheim; Dieter Glauch, Schliengen, both of Germany

[73] Assignee: Ciba Specialty Chemicals Corp., Tarrytown, N.Y.

[21] Appl. No.: 09/100,005

[22] Filed: Jun. 17, 1998

[30] Foreign Application Priority Data

Jul. 2, 1997 [CH] Switzerland ............... 1605/97

[51] Int. Cl.$^7$ ..................................................... B29C 1/26
[52] U.S. Cl. ..................... 264/102; 264/272.19
[58] Field of Search .................. 264/102, 272.11, 264/272.19, 272.2, 328.18; 528/99, 341, 92

[56] References Cited

U.S. PATENT DOCUMENTS

| | | | |
|---|---|---|---|
| 3,991,232 | 11/1976 | Kamiuchi et al. | 264/272.19 |
| 4,492,884 | 1/1985 | Asano et al. | 310/45 |
| 4,559,272 | 12/1985 | Oldham | 264/272.13 |
| 4,992,488 | 2/1991 | Ruf et al. | 523/428 |
| 5,344,604 | 9/1994 | Kusek | 264/272.11 |
| 5,451,362 | 9/1995 | Wombwell et al. | 264/102 |
| 5,589,129 | 12/1996 | Kato et al. | 264/437 |
| 5,705,541 | 1/1998 | Awe et al. | 523/220 |

FOREIGN PATENT DOCUMENTS

| | | |
|---|---|---|
| 2423072 | 12/1975 | Germany . |
| 96/01481 | 1/1996 | WIPO . |

OTHER PUBLICATIONS

Derwent Abstr. 96–007033.
Derwent Abstr. 83–812058.
Patent Abstracts of Japan No. 03269066.
Chem. Abstr. 105:80691.
Derwent Abstr. 75–81709W.

*Primary Examiner*—Angela Ortiz
*Attorney, Agent, or Firm*—Michele A. Kovaleski

[57] ABSTRACT

A process for impregnating an electrical coil which comprises a winding comprising two or more layers consisting of more than one turn of an electrically conducting wire-form material with a polymer material which electrically insulates the individual turns of the wire-form material from one another with the aid of a thermally curable epoxy resin composition, which composition is solid at room temperature and comprises the following constituents:

(a) an epoxy resin which is solid at room temperature, selected from
  (a1) polyglycidyl ethers based on novolaks;
  (a2) diglycidyl ethers based on bisphenols, and
  (a3) mixtures of more than one of components (a1) and (a2);
(b) a crosslinking agent for component (a);
(c) a suitable accelerator for the reaction of component (a) and component (b);
(d) from 15 to 70 percent by weight, based on the overall weight of the composition, of filler selected from
  (d1) calcium carbonate,
  (d2) quartz flour,
  (d3) wollastonite whose particles have an average ratio of length to cross-section which is less than 5:1;
  (d4) mixtures of components (d1), (d2) and (d3) and
  (d5) mixtures of components (d1), (d2), (d3) and (d4) with other inorganic fillers; and which also preferably comprises
(e) from 10 to 60 percent by weight, based on the overall weight of the composition, of inorganic reinforcements in the form of acicular or fibrillar particles with a length of from 0.05 to 2.5 mm which have an average ratio of length to cross-section of 5:1 or more, the overall amount of component (d) and (e) being not more than 80 percent by weight, based on the overall weight of the composition, inter alia does away with the need to use sacrificial moulds and reduces by a multiple the curing time required for completing the coating of the coils, reducing it to the region of a few minutes.

23 Claims, 2 Drawing Sheets

PROCESS FOR IMPREGNATING ELECTRICAL COILS

The present invention relates to a process for impregnating an electrical coil, comprising a winding of two or more layers each of which consists of more than one turn of an electrically conducting material in wire form, with a polymer material which electrically insulates the individual turns of the wire-form material from one another, wherein the individual windings of the coil are enveloped with the aid of a curable epoxy resin composition and this composition is thermally cured, and to particularly preferred curable compositions for carrying out the impregnation.

From WO-A-96/01481 it is known to use curable epoxy resin compositions which are liquid at room temperature and comprise (a) a liquid bisphenol A diglycidyl ether, (b) a crosslinking agent for it, (c) a suitable accelerator for the reaction of the liquid diglycidyl ether (a) with the crosslinking agent (b), and (d) a filler material which, based on component (a) and (b), comprises from 40 to 60 percent by weight of calcite and acicular, synthetic wollastonite for the impregnation and, if desired, for the coating of electrical coils comprising windings which in turn comprise a multiplicity of layers each of which consists of a large number of turns of a thin, wire-form conductor material, examples being the secondary windings of transformers or ignition coils. The use of liquid epoxy resin systems such as those mentioned, although it enables such windings to be impregnated sufficiently, i.e. enables the epoxy material to penetrate between all of the turns of a winding, nevertheless still has some disadvantages. For instance, the liquid epoxy resin systems can only be formulated in two-pack form, which as far as the user is concerned constitutes a not inconsiderable increase in processing complexity. In addition, the liquid impregnating systems referred to require the use of a sacrificial mould having the external contours desired for the finished coil. The coil to be potted has to be introduced into this mould. Subsequently it is necessary, generally following its evacuation, to fill the mould with the liquid curable epoxy resin composition and to cure the composition in the mould. After curing, the mould can no longer be removed and must therefore remain permanently around the coil, as a sacrificial mould. A further highly significant disadvantage of the abovementioned liquid epoxy resin compositions, moreover, is their extremely long curing time, which in general amounts to several hours and which, for the mass production of coils, necessitates the use of huge curing ovens.

The object of the present invention is inter alia to avoid the abovementioned disadvantages associated with the impregnation of coils, especially ignition coils, print transformers and flyback transformers.

It has now been found that such coils can even be impregnated using preferably fibre-reinforced, curable epoxy resin compositions being solid at room temperature, i.e. at a temperature from about 15 to 25° C., and having the specific composition defined below. A particular surprise in this context is that such compositions are also able to penetrate sufficiently the secondary windings of customary ignition coils and transformers even if they comprise relatively large amounts of a reinforcing material which consists of inorganic fibres with a length of up to about 2.5 mm. The use of these solid epoxy resin compositions does away with the need to use a housing (sometimes referred to as "lost housing") and reduces by a multiple the curing time required for completing the coating of the coils, reducing it to the region of a few minutes, generally not more than 15 minutes.

The present invention therefore provides in its widest sense a process for impregnating an electrical coil which comprises a winding comprising two or more layers consisting of more than one turn of an electrically conducting wire-form material with a polymer material which electrically insulates the individual turns of the wire-form material from one another with the aid of a thermally curable epoxy resin composition, which composition is solid at room temperature and comprises the following constituents:

(a) an epoxy resin which is solid at room temperature, selected from
   (a1) polyglycidyl ethers based on novolaks;
   (a2) diglycidyl ethers based on bisphenols, and
   (a3) mixtures of more than one of components (a1) and (a2);
(b) a crosslinking agent for component (a);
(c) a suitable accelerator for the reaction of component (a) and component (b);
(d) from 15 to 70 percent by weight, based on the overall weight of the composition, of filler selected from
   (d1) calcium carbonate,
   (d2) quartz flour,
   (d3) wollastonite whose particles have an average ratio of length to cross-section which is less than 5:1;
   (d4) mixtures of components (d1), (d2) and (d3) and
   (d5) mixtures of components (d1), (d2), (d3) and (d4) with other inorganic fillers.

By impregnation is meant in this application a treatment of the electrical coil whereby the individual turns of at least one coil winding are enveloped with the aid of the curable epoxy resin composition and the composition is thermally cured. This treatment may, however, comprise the total encapsulation of parts of the coil or else of the whole coil, including the coil former, with the curable epoxy resin composition.

In addition, the composition employed in the process of the invention preferably comprises:

(e) from 10 to 60 percent by weight, based on the overall weight of the composition, of inorganic reinforcements in the form of acicular or fibrillar particles with a length of from 0.05 to 2.5 mm which have an average ratio of length to cross-section of 5:1 or more, the overall amount of component (d) and (e) being not more than 80 percent by weight, based on the overall weight of the composition.

It is preferred to employ specially selected compositions in which the reinforcement (e) consists of acicular or fibrillar particles having a length of from 0.15 to 2.5 mm. The present invention additionally provides these compositions.

With particular preference, the reinforcement (e) comprises a glass fibre material, especially milled or chopped glass fibres having a length of from 0.05 to 2.5 mm and a diameter of preferably from 10 to 30 $\mu$m, which are available in various forms and commercially. A reinforcing material which has proven particularly suitable, for example, comprises glass fibres with a length from 0.05 mm, in particular from 0.15 mm, to 2 mm, in particular to 1 mm: for example, approximately 0.2 to 0.25 mm.

The novolak-based polyglycidyl ethers which are employed in the process of the invention and in the compositions of the invention as component (a1) are in particular:

(a1.1) polyglycidyl ethers based on epoxy-phenol novolaks,
(a1.2) polyglycidyl ethers based on epoxy-cresol novolaks, or
(a1.3) mixtures of epoxy novolaks of type (a1.1) and/or (a1.2).

Component (a2) preferably comprises diglycidyl ethers based on bisphenol A. These may, for example, be pre-extended (advanced) resins obtainable by reacting bisphenol A diglycidyl ether with a stoichiometric deficit of substances having two functional groups which are reactive with epoxide groups, in particular by reacting from 1.1 to 2 mol of bisphenol A diglycidyl ether with 1 mol of bisphenol A.

The crosslinking agent (b) is judiciously selected from:
(b1) dicyandiamide,
(b2) polycarboxylic anhydrides and
(b3) mixtures of more than one of components (b1) and/or (b2) and/or one or more polyphenols.

If an organic carboxylic anhydride is employed as crosslinking agent it is preferably an aromatic or cycloaliphatic polycarboxylic anhydride, especially a corresponding dicarboxylic anhydride, such as phthalic, hexahydrophthalic or methyltetrahydrophthalic anhydride. Preference is given in particular to carboxylic anhydrides which are solid at room temperature.

If the crosslinking agent includes a certain proportion of polyphenols, this may be advantageous in terms of the processing of the impregnating compositions. Since, however, the presence of relatively large amounts of polyphenols may hinder the penetration of the curable composition into the winding and hence reduce the depth of impregnation, the upper limit for the proportion of polyphenol in the crosslinking agent is guided by the depth of impregnation required.

Preferred polyphenols are:
phenol novolaks,
cresol novolaks and/or
mixtures of novolaks of the said types.

The crosslinking agent (b) is employed in the commonly used amounts; for example, in amounts of up to 50 percent by weight, preferably up to 25 percent by weight, based on the epoxy resin. Dicyandiamide is used with particular preference in an amount of from 0.16 to 0.5 mol per epoxide equivalent of the composition, and in particular is added in amounts such that in the compositions of the invention there is from 0.25 to 0.35 mol of dicyandiamide per epoxide equivalent.

When dicyandiamide is employed as crosslinking agent the latency of the epoxy resin compositions of the invention is particularly good, meaning that they can be stored, for example, without problems at room temperature (from about 15 to 25° C.).

As accelerators (d) it is possible to employ all customary substances which the skilled worker knows accelerate the reaction of epoxy resins with dicyandiamide or with polyphenols or, respectively, with organic anhydrides. Examples of accelerators for the reaction with dicyandiamide are alkali metal alcoholates, tertiary amines, especially hexamethylenetetramine, phosphines, such as triphenylphosphine, quaternary ammonium compounds, substituted ureas, such as N-(4-chlorophenyl)-N,N'-dimethylurea or N-(3-chloro-4-methylphenyl)-N,N'-dimethylurea, Mannich bases, such as 2,4,6-tris (dimethylaminomethyl)phenol or 2,4,6-tris (diethylaminomethyl)phenol, imidazole or imidazole derivatives, such as 2-phenylimidazole, 2-ethylimidazole, 2-methylimidazole or benzimidazole, and complexes of $BCl_3$ and $BF_3$ with tertiary amines such as trimethylamine, octyldimethylamine, triethylamine, piperidine, pyridine or hexamethylenetetramine. Preference is given to imidazoles, especially 2-ethylimidazole. Examples of accelerators for the reaction with polyphenols are tertiary amines, such as benzyldimethylamine, imidazoles, such as imidazole, 2-phenylimidazole, 2-ethylimidazole, 2-methylimidazole or benzimidazole, or quaternary ammonium compounds. Examples of accelerators for the reaction with carboxylic anhydrides are tertiary amines and their salts, such as N-benzyldimethylamine or triethanolamine, Mannich bases, such as those already mentioned above, imidazole and imidazole derivatives, quaternary ammonium salts, such as benzyltrimethylammonium chloride, phosphonium salts, such as tetraphenylphosphonium bromide, and alkali metal alkoxides. The amount of accelerator is preferably from 1 to 30 parts by weight per 100 parts by weight of catalyst, with particular preference from 3 to 20 parts by weight and, in particular, from 5 to 12 parts by weight.

The particle size distribution of the filler which forms component (d) of the compositions described is preferably from 0.1 to 200 $\mu$m, in particular from 0.2 to 60 $\mu$m. The calcium carbonate employed as filler is preferably finely divided and essentially anhydrous calcium carbonate. Examples of inorganic fillers other than calcium carbonate, quartz flour and wollastonite are kaolin, dolomite, barium sulfate, talc, mica, alumina or aluminium oxide trihydrate. Where mixtures of calcium carbonate, quartz flour and/or wollastonite with other fillers are used, the compositions comprise preferably at least 20 and, in particular, at least 30 percent by weight of calcium carbonate, quartz flour and/or wollastonite. The other fillers can be present, for example, in an amount of up to 40, preferably in an amount of up to 30, percent by weight. With particular preference, wollastonite is the sole filler present in the compositions employed in accordance with the invention.

In some cases it is found favourable, moreover, for the compositions employed in accordance with the invention to comprise a toughener as a further component (f). The toughener in this case is preferably employed in amounts of from 0.5 to 5, preferably in the range from about one to two, percent by weight, based on the overall composition.

The toughener (f) is preferably selected from:
(f1) polysiloxane-modified epoxy resins and
(f2) block copolymers based on polydimethylsiloxanes and caprolactone or on polycaprolactones.

Tougheners of this kind are known to the skilled worker and are obtainable in various forms and commercially.

If a toughener of type (f1) is employed it is in particular a polysiloxane-modified diglycidyl ether based on bisphenol A.

The compositions used in accordance with the invention to impregnate electrical coils may additionally comprise a mould release agent as a further component (g), examples being Hoechst OP-Wachs® (partially hydrolysed montan wax), Hoechst-Wachs KSL® (montan wax), carnauba wax, calcium stearate or similar mould release agents, or mixtures of one or more of the said substances.

The curable compositions employed in accordance with the invention may additionally comprise further customary additives, examples being adhesion promoters for the fillers and the reinforcing materials, such as, in particular, silane adhesion promoters, pigments, such as carbon black, or flexibilizers, In one specific embodiment of the process of the invention a curable composition is employed which comprises the following constituents as components (a), (b) and (c):
(a2) one or more diglycidyl ethers based on bisphenols;
(b2) one or more polycarboxylic anhydrides;
(c) a suitable accelerator for the reaction of component (a2) and component (b2).

In a particularly preferred embodiment of the process of the invention the composition used to coat coils comprises the following constituents as components (a), (b) and (c):

(a) an epoxy resin which is solid at room temperature, selected from
   (a1) polyglycidyl ethers based on novolaks;
   (a2) diglycidyl ethers based on bisphenols, and preferably
   (a3) mixtures of more than one of components (a1) and (a2);
(b) a crosslinking agent selected from
   (b1) dicyandiamide and
   (b4) mixtures of dicyandiamide and polyphenols (b2); and
(c) a suitable accelerator for the reaction of component (a) and the chosen component (b1) or (b4), for instance hexamethylenetetramine.

The latter embodiment of the process produces impregnating compositions having a particularly high Tg generally above 150° C. (determined by the torsional vibration test of ISO 6721, heating rate 2° C./min).

In the case of preferred specific variants of the latter embodiment of the coating composition used in accordance with the invention, component (a) is a polyglycidyl ether based on a cresol novolak and/or the crosslinking agent (b) is either dicyandiamide alone or a mixture of dicyandiamide and polyphenols in which the polyphenols are, in particular, phenol novolaks, cresol novolaks or mixtures of these novolaks.

The curable compositions employed in accordance with the invention can be prepared and homogenized, for example, in a customary manner with the aid of known mixing apparatus, such as a ball mill, co-kneader, roll mill or extruder, with or without the melting of the compositions followed, if required, by comminution of the melted material. Appropriate combinations of the abovementioned homogenization techniques can of course also be employed. It is likewise possible, for example, to dissolve and/or suspend the components of the curable compositions in an appropriate solvent and then to evaporate the solvent to leave the homogenized composition in solid form.

For the impregnation of the coil, this coil is introduced into a mould straight away or following preliminary heating. Then the curable composition is introduced into the coil-containing mould and is thermally cured therein under pressure, preferably at a very low cavity pressure of, for example, not more than 100 MPa for a period of, for example, up to a maximum of 10 minutes, preferably less than about 5 minutes, preferably at temperatures in the range from 140 to 250° C., in particular from 160 to 200° C. and, with great preference, in the region of about 180° C. The time pressure profile in the course of filling, and the maximum pressure, is dependent on the coil to be impregnated. The parameters referred to can easily be determined experimentally by the skilled worker.

Before the curable composition is introduced, the mould is preferably evacuated and the curable composition is introduced into the coil-containing, evacuated mould. This is the case in particular for the chamber windings which are common at present.

The impregnation process of the invention is suitable, for example, for impregnating coil windings having a winding density of up to 1000 turns per mm², preferably up to 500 turns per mm², it being possible for example to employ wire with diameters of down to 20 μm, preferably down to 50 μm, for the windings. The thickness of the overall windings in this case can be, for example, up to 7.5 mm, preferably up to 5 mm. Such windings are found, for example, in ignition coils, print transformers and flyback transformers.

In the case of the impregnation process of the invention it is preferred to operate in accordance with the principle of a customary compression moulding, transfer moulding or injection moulding process.

If an injection moulding process is employed, it is preferred—owing to the comparatively low melt viscosities of the curable compositions employed in accordance with the invention—to use a cylinder assembly with a closeable injection nozzle, so that the nozzle can be closed when, for example, the mould is open. It may likewise be advantageous in this case to use a screw which has a nonreturn valve.

EXAMPLES

GENERAL PROCEDURE FOR PREPARING IMPREGNATING COMPOSITIONS

Glass fibres and/or fillers are mixed with a silane adhesion promoter and are milled for 30 minutes with a ball mill. If a toughener is used, it is milled subsequently in the required amount with the filler for 20 minutes, likewise in a ball mill. Finally, all of the components of the curable compositions, with the exception of the glass fibres, are milled for about 4.25 hours in a ball mill. The glass fibres are then added, and milling is continued for 45 minutes. The resulting powders are, finally, processed to granules using a compressor.

The impregnating compositions specified in the examples are prepared using the additives, reinforcing materials and fillers characterized below:

| Commercial name | Chemical composition |
| --- | --- |
| NYAD ® 200 | Natural wollastonite (200 mesh) |
| NYAD ® 325 | Natural wollastonite (325 mesh) |
| OMYA ® BSH | Natural, surface-coated calcium carbonate powder (grain size distribution 0.1–20 μm; $D_{50}$ = 2.4 μm) |
| Milled Glass ® 737BD (Owens Corning) | Milled glass fibres (average length = 225 μm, Ø = 15–16 μm) |
| Albidur ® EP 2240 | Siloxane-modified bisphenol A epoxy resin |
| Hoechst OP ® wax 125U | Partially hydrolysed montan wax |
| Hoechst KSL ® wax | Montan wax |
| Silan A 187 ® | Silane adhesion promoter |
| Printex V ® | Carbon black |

Figure 1:
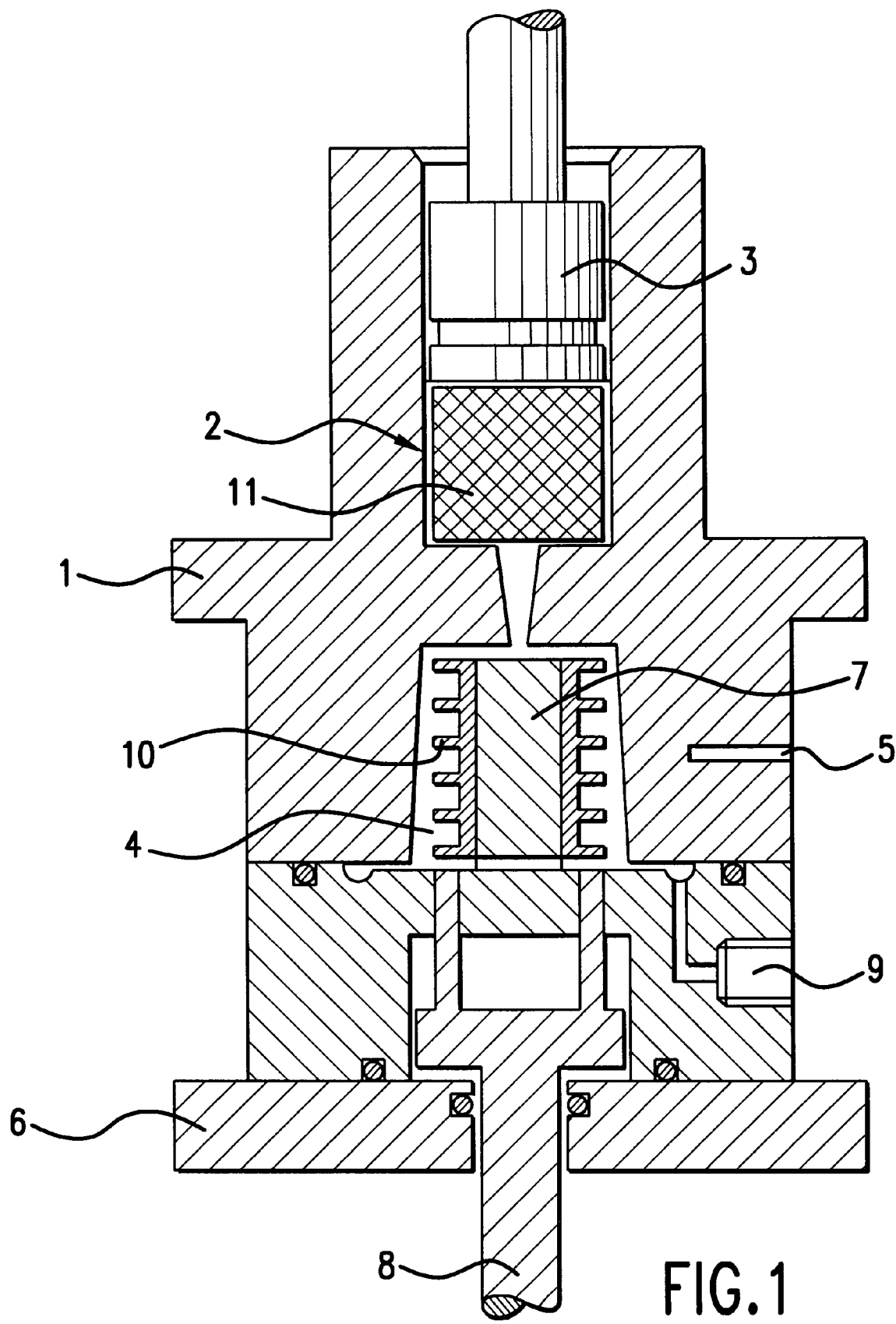
FIG. 1 shows a diagram of the press tool with which the test coils in the subsequent examples are impregnated.
Figure 2:
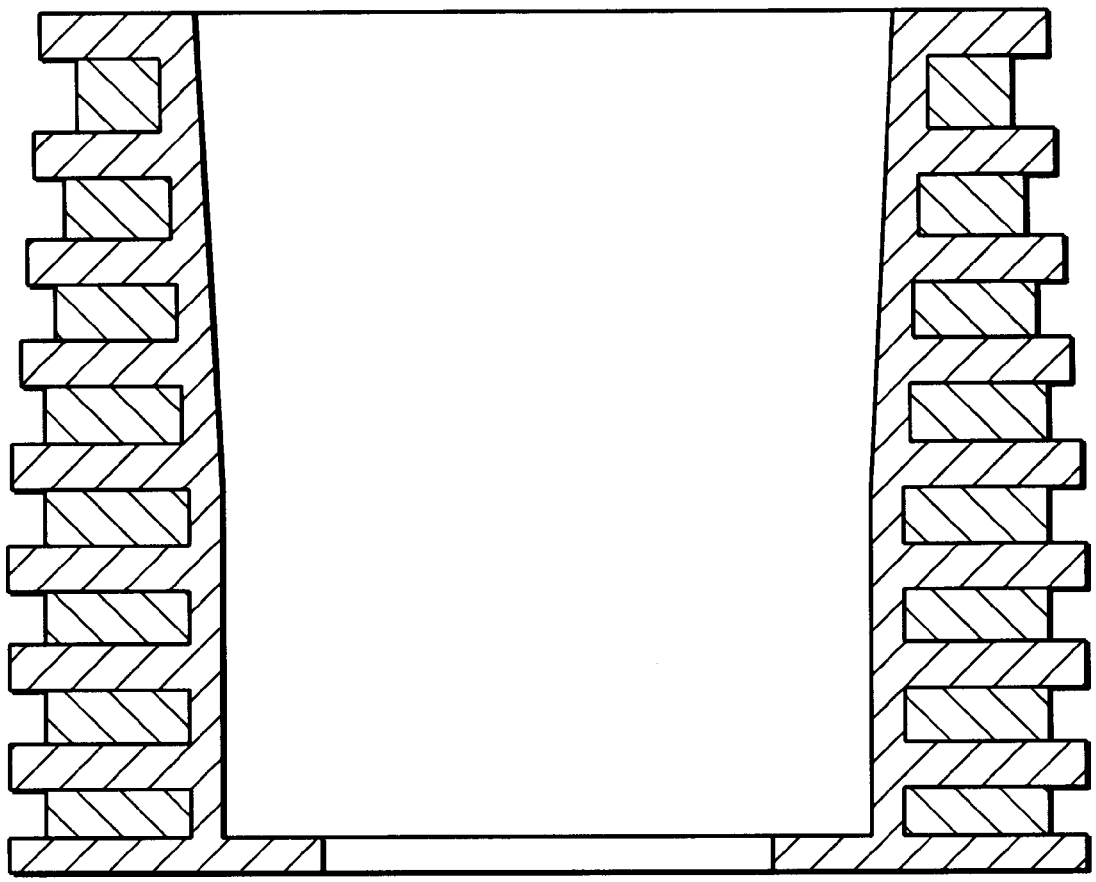
FIG. 2 shows a longitudinal section through the coil former used in the examples, and its dimensions.

The performance properties of the impregnating compositions are determined in every example unless specified otherwise with the aid of the measurement methods indicated below:
TI: Torsional vibration test in accordance with ISO 6721
Flexural strength: ISO 178
Flexural modulus: ISO 178
Impact strength: ISO 179/1
Linear thermal expansion coefficient α: DIN 53752 (temperature range 20–80° C.)
Impregnating, determining the depth of impregnation, assessing the quality of impregnation:

In all of the examples the test coil is impregnated in accordance with the principle of transfer moulding, using the test apparatus shown diagrammatically in FIG. 1. This apparatus comprises two parts (1) and (6) which can be separated from one another. The first part (1) has an injection compartment (2) for receiving a tablet (11) consisting of the impregnating composition of the invention, the transfer piston (3), the cavity (4) and a bore (5) for accommodating a temperature sensor. The second part (6) comprises a core (7) for mounting the coil (10) which is to be impregnated, a device (8) for removing the finished impregnated coil from the core (7) and a connection (9) for evacuating the cavity (4). A coil (10) which has been preheated to about 110° C. and has the dimensions indicated in FIG. 2, and which in all of its chambers has a winding comprising copper wire with a diameter of 94 μm with a winding density of approximately 100 turns per mm², the thickness of the winding rising from the topmost to the bottommost chamber from about 3.5 to about 5.5 mm, is introduced into the cavity (4) of the impregnating toot (1,6), which is heated at 180° C. The granular impregnating composition is compressed into a tablet while still cold and then is heated to about 70° C. using a high-frequency preheating device. The tablet (11) preheated in this way is introduced into the injection compartment (2), and a vacuum of about 35 mbar is applied to the cavity. Subsequently, the impregnating composition is transferred into the cavity (4) over a period of about 15 s with the aid of the piston (3) (injection pressure between 80 and 150 bar). The subsequent curing time is 5 minutes. The coated and impregnated coil is demoulded. The coil, having been withdrawn, is sawn in the lengthwise direction and polished. A microscope is used to measure the depth of impregnation achieved in each case, and the quality of impregnation is assessed visually. In this assessment, impregnation is classified as "good" if more than 95 percent of the space between the wire turns of a winding has been filled with the impregnating composition.

Crack resistance:

In order to determine the crack resistance a specimen is produced by coating a sharp-edged rectangular metal plate measuring 60 mm in length, 30 mm in width and 4 mm in thickness with the respective impregnating composition, leaving an area of about 8 mm by 8 mm free at each of the four corners of the metal plate, and the composition is cured at 170° C. to 180° C. The thickness of the coating is approximately 3 mm in the direction of the long side and the broad side of the metal plate, and about 2 mm perpendicular thereto. After demoulding, the specimen is subjected to the sequence of treatment steps indicated in the table below, and, following each treatment step, is investigated for cracking in the coating composition. The classification in terms of cracking corresponds to the last treatment step following which the specimen still shows no cracking.

| Step | No cracking after |
|---|---|
| 1 | — |
| 2 | being left at room temperature for 1 hour after demoulding |
| 3 | being left at room temperature for 4 hours after demoulding |
| 4 | being left at room temperature for 24 hours after demoulding |
| 5 | Step 4 + cooling from room temperature to 0° C. in ice-water, 30 min at 0° C. |
| 6 | Step 5 + 30 min at 100° C., cooling to 0° C. in ice-water, 30 min at 0° C. |
| 7 | Step 6 + cooling from room temperature to −20° C., 15 min at −20° C. |
| 8 | Step 7 + cooling from room temperature to −40° C., 15 min at −40° C. |
| 9 | Step 8 + cooling from 100° C. to −40° C., 15 min at −40° C. |
| 10 | Step 9 + cooling from 100° C. to −60° C., 15 min at −60° C. |

EXAMPLE 1

1 kilogram of an impregnating composition is produced and examined in accordance with the general procedure described above; its composition is as follows:

| Component | Percent by weight |
|---|---|
| Epoxy-cresol novolak (epoxide content 4.3 eq/kg; Kofler melting point 79° C.) | 19.51 |
| Advanced bisphenol A diglycidyl ether (epoxide content about 1.7 eg/kg; Kofler melting point 55–65° C.) | 12.68 |
| Cresol-formaldehyde resin (melting point 97–104° C.) | 0.99 |
| Dicyandiamide | 2.7 |
| ZK 191.2-K granules (accelerator based on o-cresol novolak and 2-ethylimidazole; Kofler melting point 60–70° C.) | 0.2 |
| NYAD 200 | 46.79 |
| Milled Glass 737 BD | 15.0 |
| Hoechst OP wax 125U | 1.7 |
| Silan A 187 | 0.23 |
| Printex V | 0.2 |

The impregnating composition has the following properties:

| Property | |
|---|---|
| Depth of impregnation [mm] | 3.5 |
| Quality of impregnation | good |
| Tg [° C.] | 170 |
| Flexural strength [MPa] | 110 |
| Flexural modulus [MPa] | 14600 |
| Impact strength [kJ/m²] | 6 |
| Cracking resistance | 7 |
| Linear thermal expansion coefficient α[K⁻¹] | $33 \cdot 10^{-6}$ |

EXAMPLE 2

1 kilogram of a further impregnating composition is produced in accordance with the general procedure described above; its composition is as follows:

| Component | Percent by weight |
|---|---|
| Epoxy-cresol novolak (epoxide content 4.3 eq/kg; Kofler melting point 79° C.) | 33.0 |
| Dicyandiamide | 4.0 |
| ZK 191.2-K granules (accelerator based on o-cresol novolak and 2-ethylimidazole; Kofler melting point 60–70° C.) | 0.2 |
| NYAD 200 | 43.9 |
| Milled Glass 737 BD | 15.0 |
| Albidur EP 2240 | 2.0 |
| Hoechst KSL wax | 1.7 |
| Silan A 187 | 0.2 |

This impregnating composition has the following properties:

| Property | |
|---|---|
| Depth of impregnation [mm] | 5.5 |
| Quality of impregnation | good |
| Tg [° C.] | ≈200 |

| Property | |
|---|---|
| Flexural strength [MPa] | 135 |
| Flexural modulus [MPa] | 11600 |
| Impact strength [kJ/m$^2$] | 7 |
| Linear thermal expansion coefficient α[K$^{-1}$] | 33 · 10$^{-6}$ |

EXAMPLE 3

1 kilogram of an impregnating composition is produced in accordance with the procedure described above; its composition is as follows:

| Component | Percent by weight |
|---|---|
| Advanced bisphenol A diglycidyl ether (epoxide content about 1.7 eq/kg; Kofler melting point 55–65° C.) | 31.7 |
| Phthalic anhydride | 5.2 |
| BCl$_3$N(CH$_3$)$_3$ complex | 0.3 |
| NYAD 325 | 40.4 |
| OMYA BSH | 19.0 |
| Albidur EP 2240 | 2.0 |
| Hoechst KSL wax | 1.4 |

This impregnating composition has the following properties:

| Property | |
|---|---|
| Depth of impregnation [mm] | 5.5 |
| Quality of impregnation | good |
| Tg [° C.] | ≈120 |

A complete impregnation of good quality is also achieved with the impregnating compositions referred to in the above examples if impregnation is carried out not of the test winding (Test) impregnated in the examples but of, for example, the windings A, B and C set out in the table below:

| Winding | Wire diameter [μm] | Winding density [1/mm$^2$] | Winding thickness [mm] |
|---|---|---|---|
| Test | 94 | 100 | 3.5–5.5 |
| A | 61 | 180 | 0.95 |
| B | 40 | 465 | 3.5 |
| C | 65 | 254 | 3 |

EXAMPLE 4

1 kilogram of an impregnating composition is produced and examined in accordance with the general procedure described above; its composition is as follows:

| Component | Percent by weight |
|---|---|
| Epoxy-cresol novolak (epoxide content 4.3 eq/kg; Kofler melting point 79° C.) | 19.50 |
| Advanced bisphenol A diglycidyl ether (epoxide content about 1.7 eg/kg; Kofler melting point 55–65° C.) | 12.68 |
| Cresol formaldehyde resin (melting point 97–104° C.) | 1.00 |
| Dicyandiamide | 2.7 |
| Hexamethlenetetramine | 0.2 |
| NYAD 200 | 46.79 |
| Milled Glass 737 BD | 15.00 |
| Hoechst OP wax 125U | 1.7 |
| Silan A 187 | 0.23 |
| Printex V | 0.2 |

This impregnating composition has the following properties:

| Property | |
|---|---|
| Quality of impregnation | good |
| Tg [° C.] | 160 |
| Flexural strength [MPa] | 130 |
| Flexural modules [MPa] | 13500 |
| Impact strength [kJ/m$^2$] | 7.5 |
| Linear thermal expansion coefficient α[K$^{-1}$] | 31 · 10$^{-6}$ |

What is claimed is:

1. A process for impregnating an electrical coil made up of two or more layers consisting of more than one turn of an electrically conducting material in wire form, which process comprises impregnating the coil with a thermally curable epoxy resin composition that is solid at room temperature and comprises
    (a) an epoxy resin which is solid at room temperature, selected from
        (a1) polyglycidyl ethers based on novolaks;
        (a2) diglycidyl ethers based on bisphenols, and
        (a3) mixtures of more than one of components (a1) and (a2);
    (b) a crosslinking agent for component (a);
    (c) a suitable accelerator for the reaction of component (a) and component (b);
    (d) from 15 to 70 percent by weight, based on the overall weight of the composition, of filler selected from
        (d1) calcium carbonate,
        (d2) quartz flour,
        (d3) wollastonite whose particles have an average ratio of length to cross-section which is less than 5:1;
        (d4) mixtures of components (d1), (d2) and (d3) and
        (d5) mixtures of components (d1), (d2), (d3) and (d4) with other inorganic fillers,
    wherein the epoxy resin composition electrically insulates the individual turns of the material in wire form from one another.

2. A process according to claim 1, where the composition additionally comprises:
    (e) from 10 to 60 percent by weight, based on the overall weight of the composition, of inorganic reinforcements in the form of acicular or fibrillar particles with a length of from 0.05 to 2.5 mm which have an average ratio of length to cross-section of 5:1 or more,
    the overall amount of component (d) and (e) being not more than 80 percent by weight, based on the overall weight of the composition.

3. A process according to claim 2, where the reinforcement (e) consists of acicular or fibrillar particles with a length of from 0.15 to 2.5 mm.

4. A process according to claim 1, where the reinforcement (e) is a glass fibre material.

5. A process according to claim 1, where component (a1) is selected from:
- (a1.1) polyglycidyl ethers based on epoxy-phenol novolaks,
- (a1.2) polyglycidyl ethers based on epoxy-cresol novolaks and
- (a1.3) mixtures of components (a1.1) and (a1.2).

6. Process according to claim 1, where component (a2) is a diglycidyl ether based on bisphenol A.

7. A process according to claim 1, where the crosslinking agent
- (b) is selected from:
  - (b1) dicyandiamide,
  - (b2) polycarboxylic anhydrides and
  - (b3) mixtures of more than one of components (b1) and/or (b2) and/or one or more polyphenols.

8. A process according to claim 7, where the polyphenols are selected from:
- phenol novolaks,
- cresol novolaks and
- mixtures of such novolaks.

9. A process according to claim 1, where the filler is wollastonite.

10. A process according to claim 9, where the composition additionally comprises
- (f) a toughener.

11. A process according to claim 10, where the toughener (f) is selected from:
- (f1) polysiloxane-modified epoxy resins and
- (f2) block copolymers based on polydimethylsiloxanes and caprolactone or on polycaprolactones.

12. A process according to claim 11, where the toughener (f1) is a polysiloxane-modified diglycidyl ether based on bisphenol A.

13. A process according to claim 1, where the composition comprises the following constituents as components (a), (b) and (c):
- (a2) one or more diglycidyl ethers based on bisphenols;
- (b2) one or more polycarboxylic anhydrides;
- (c) a suitable accelerator for the reaction of component (a2) and component (b2).

14. A process according to claim 1, where the composition comprises the following constituents as components (a), (b) and (c):
- (a) an epoxy resin which is solid at room temperature, selected from
  - (a1) polyglycidyl ethers based on novolaks;
  - (a2) diglycidyl ethers based on bisphenols, and preferably
  - (a3) mixtures of more than one of components (a1) and (a2);
- (b) a crosslinking agent selected from
  - (b1) dicyandiamide and
  - (b4) mixtures of dicyandiamide and polyphenols; and
- (c) a suitable accelerator for the reaction of component (a) and the chosen component (b1) or (b4), preferably hexamethylenetetramine.

15. A process according to claim 14, where component (a) is a polyglycidyl ether based on a cresol novolak.

16. A process according to claim 14, where the crosslinking agent (b) is dicyandiamide.

17. A process according to claim 14, where the crosslinking agent (b) is a mixture of dicyandiamide and polyphenols and the polyphenols are selected from
- phenol novolaks,
- cresol novolaks and
- mixtures of such novolaks.

18. A process according to claim 1, where the composition additionally comprises
- (g) a mould release agent.

19. A process according to claim 1, where the coil is introduced into a mould and then the curable composition is introduced into the coil-containing mould and is thermally cured therein under pressure.

20. A process according to claim 19, where the mould is evacuated before the curable composition is introduced and the curable composition is introduced into the coil-containing, evacuated mould.

21. A process according to claim 1 in accordance with the principle of the compression moulding, transfer moulding or injection moulding process.

22. An injection moulding process according to claim 21, where a cylinder assembly is used whose injection nozzle is closeable.

23. An injection moulding process according to claim 20, where a screw is used which has a non-return valve.

* * * * *